United States Patent
Stuible et al.

(10) Patent No.: US 6,304,802 B1
(45) Date of Patent: Oct. 16, 2001

(54) SYSTEM FOR MONITORING TIRE STATUS

(75) Inventors: Ewald Stuible, Eberdingen; Walter Berger, Erligheim; Martin Pfau, Weissach, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/381,459

(22) PCT Filed: Feb. 11, 1998

(86) PCT No.: PCT/DE98/00371

§ 371 Date: Sep. 21, 1999

§ 102(e) Date: Sep. 21, 1999

(87) PCT Pub. No.: WO98/42524

PCT Pub. Date: Oct. 1, 1998

(30) Foreign Application Priority Data

Mar. 22, 1997 (DE) .............................. 197 12 097

(51) Int. Cl.[7] .................................................. B60C 23/00
(52) U.S. Cl. .............................. 701/29; 701/76; 340/442; 303/169
(58) Field of Search ................................. 701/75, 76, 92; 303/122, 122.01, 122.03, 169; 340/442, 444

(56) References Cited

U.S. PATENT DOCUMENTS

| | | | |
|---|---|---|---|
| 4,876,528 | * 10/1989 | Walker et al. ....................... | 340/442 |
| 5,569,848 | * 10/1996 | Sharp ................... | 73/146.2 |
| 5,712,616 | * 1/1998 | Schmitt et al. ...................... | 340/442 |
| 5,721,528 | * 2/1998 | Boesch et al. ....................... | 340/442 |
| 5,801,306 | * 9/1998 | Chamussy et al. ................... | 73/146.2 |
| 5,866,812 | * 2/1999 | Nishihara et al. ................... | 73/146.2 |
| 5,936,519 | * 8/1999 | Nakajima et al. ................... | 340/444 |

FOREIGN PATENT DOCUMENTS

| | | |
|---|---|---|
| 3236520 | 4/1984 | (DE) . |
| 3630116 | 3/1988 | (DE) . |
| 4113278 | 10/1992 | (DE) . |
| 4327492 | 2/1995 | (DE) . |
| 0449845 | 10/1991 | (EP) . |
| 0552827 | 7/1993 | (EP) . |
| 2226434 | 6/1990 | (GB) . |

\* cited by examiner

*Primary Examiner*—Tan Nguyen
*Assistant Examiner*—Dale Na Tran
(74) *Attorney, Agent, or Firm*—Walter Ottesen

(57) ABSTRACT

The invention proceeds from a system for detecting a condition of the wheels of a motor vehicle. For this purpose, means are provided for generating rpm signals, which represent the rotational movements of the wheels, and evaluation means, by means of which a signal is outputted in dependence upon the generated signals, which signal represents the display-relevant condition. The essence of the invention is that the evaluation means are so configured that, first, and dependent upon the generated rpm signals, first difference values are formed for the rpm differences of at least two vehicle wheels on the two sides of the vehicle. Depending upon a first comparison of the formed difference values to each other and/or to pregivable first threshold values, the signal, which represents a display-relevant condition, is outputted. With the invention, one obtains a very simple and cost-effective wheel condition detection (emergency wheel detection, tire air loss detection) which operates correctly also when the vehicle drives through a curve.

8 Claims, 1 Drawing Sheet

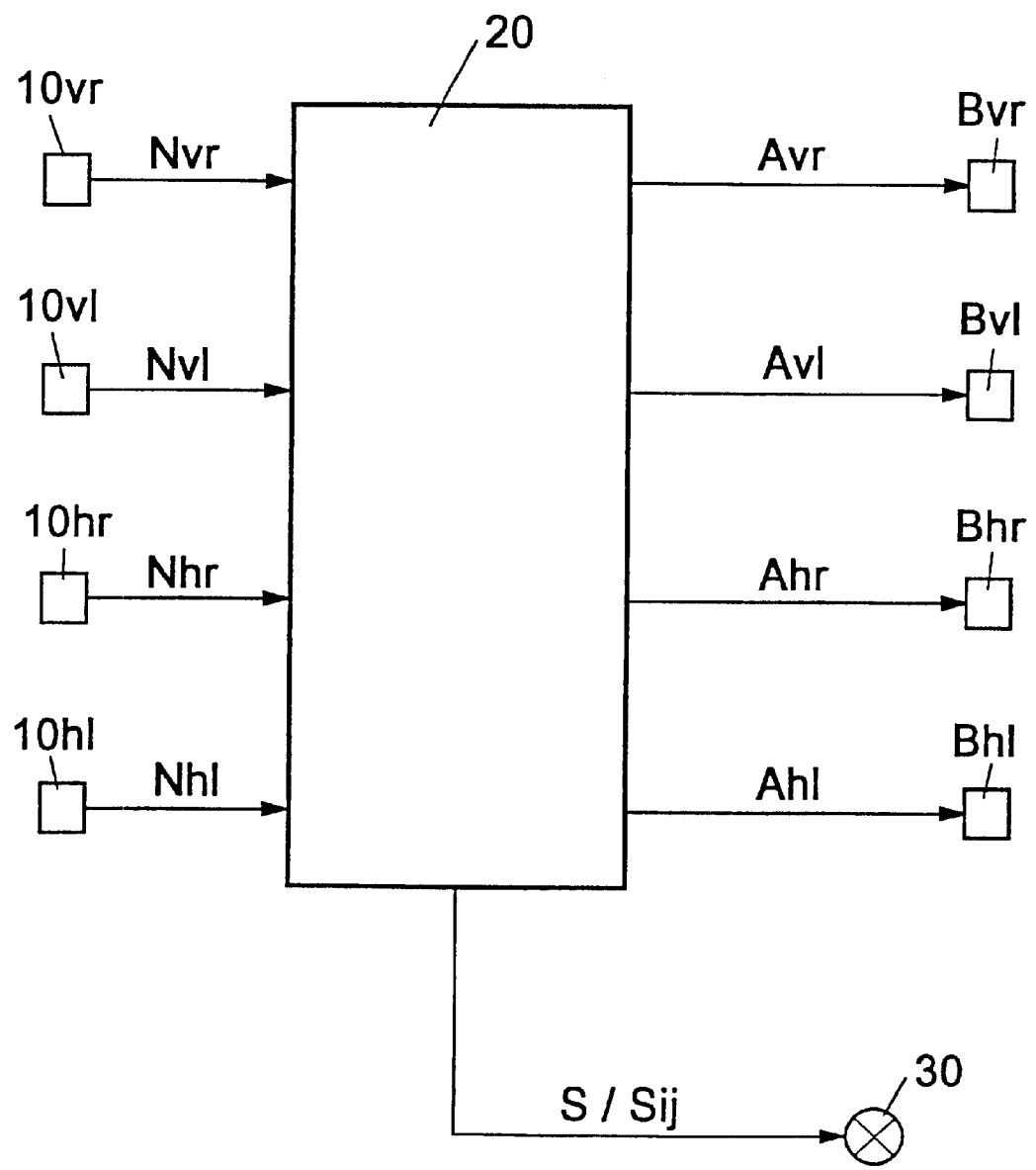

SYSTEM FOR MONITORING TIRE STATUS

FIELD OF THE INVENTION

The invention proceeds from a system for monitoring a condition of the wheels in a motor vehicle.

BACKGROUND OF THE INVENTION

From the state of the art, an anti-blocking control system, an anti-slip control system, a braking force distribution system and a driving dynamic control system are known which control the action of the brakes and/or drives to the individual wheels or individual vehicle axles. An important influence quantity is, inter alia, the rpm of the individual wheels. With a reduction of the diameter of a wheel (for example, by the mounting of a so-called emergency wheel or by a loss in air pressure), erroneous computations which affect safety can occur in such systems because of an incorrect wheel rpm detection. Emergency wheels have, as a rule, a circumference which is up to 25% less than the normal wheels.

From the state of the art, systems for detecting the condition of tires or wheels are known in many variations. Here, of special significance is the detection of a wheel or tire diameter which deviates from the other wheels. Such a deviation can either be caused by a loss in tire air or by a substitute wheel having a deviating diameter, for example, an emergency wheel.

DE-OS 36 30 116 and DE-PS 32 36 520 describe arrangements for indicating the condition of tires of a vehicle wherein the differences of the rotational speeds of individual wheels are determined at specific operating conditions (unbraked, unaccelerated straight-line travel). It is especially suggested to standardize these rotational speeds to the particular vehicle road speed.

A tire tolerance compensation is described in DE-OS 41 13 278 wherein ratios of the rpm speeds of wheels on respective sides of the vehicle are formed in order to compensate the wheel rpms and corrected values for compensating are derived therefrom.

For an anti-blocking control system, a system for detecting an emergency wheel is described in EP,B1,0 449 845 wherein the slip values of the wheels are determined from the wheel rotational speeds and the estimated vehicle road speed (reference speed). If a slip value increases above a threshold value for a specific time duration, then the presence of an emergency wheel is detected and the anti-blocking controller is switched off.

SUMMARY OF THE INVENTION

The object of the present invention is to optimize the detection of the condition of the wheel or tire.

As already mentioned, the invention proceeds from a system for detecting a condition of the wheels of a motor vehicle. For this purpose, means are provided for generating rpm signals which represent the rotational movements of the wheels and evaluation means by means of which a signal is outputted in dependence upon the generated signals and which signal represents the condition relevant for display. The essence of the invention is to configure the evaluation means in such a way that first, and in dependence upon the generated rpm signals, first difference values for the rpm differences of at least two vehicle wheels on the two vehicle sides are formed. The signal, which represents a condition relevant for display, is outputted in dependence upon a first comparison of the formed difference values to pregiven first threshold values.

With the invention, one achieves a very simple and cost-effective wheel condition detection which also operates correctly during curve travel of the vehicle. It is especially provided that it is recognized as a condition of the wheels whether a wheel has a lesser diameter than the remaining wheels (emergency wheel detection) and/or whether a loss of air has occurred in a wheel (tire air loss detection).

It is especially provided that the first difference values, which are formed for each side of the vehicle, are each compared to pregiven first threshold values and the signal is then outputted when the first difference value of the one vehicle side exceeds a first threshold value and the first difference value of the other vehicle side drops below a first threshold value.

It can be further provided that, in dependence upon the generated rpm signals, second difference values for the rpm differences of at least two vehicle wheels in the rearward and forward vehicle areas are formed. The signal, which represents a condition relevant for display, is only outputted when the difference of the second difference values is located within a band determined by pregivable second threshold values. One obtains a reliable and precise detection of an emergency wheel which is present from the check as to whether the difference of the second difference values lies within a specific band.

Whereas the embodiments described until now can only indicate whether a condition of the wheel or tire is present which is relevant for display, it can be determined with the following supplement which of the monitored wheels has a condition relevant to display.

For this purpose, the signal is also dependent upon a third comparison of the individual rpm signals of the wheels on the right vehicle side and on the left vehicle side. Furthermore, the signal is dependent upon a fourth comparison of the second difference values (rpm differences of two vehicle wheels on the two vehicle sides) to each other.

In an especially advantageous configuration of the invention, it is provided that the signal, which represents a display-relevant condition, is only outputted when the display-relevant condition is detected for a pregiven time duration. That is, depending upon requirement, a time-dependent filtering is provided.

For systems which have only a single sensor for detecting the rpm of the rearward wheels, it is provided that the signal is outputted when the formed first difference values both exceed a pregiven third threshold value.

The first, second and/or third threshold values are pregiven especially in dependence upon a value which represents the vehicle longitudinal speed.

Display means are especially provided by means of which a condition, which is relevant for display, is brought to the attention of the driver of the vehicle by driving the display means with the signal. Alternatively, or as a supplement, braking control systems and/or drive control systems are provided whose operating state is changed in dependence upon the outputted signal.

BRIEF DESCRIPTION OF THE DRAWING

The invention will now be explained with reference to the single FIGURE (FIG. 1) which shows a block circuit diagram of the system according to the invention.

DESCRIPTION OF THE PREFERRED EMBODIMENTS OF THE INVENTION

An embodiment of the invention will be discussed in greater detail with reference to the drawing.

FIG. 1 shows rpm sensors with the reference characteristic 10ij. These sensors detect the rpm of the wheels of the vehicle and output corresponding rpm signals Nij. The index i characterizes the association of the corresponding quantities to the forward axle or rearward axle and the index j characterizes the association of corresponding quantities for the right and left vehicle sides. The wheel rpm signals Nij are supplied to the brake drive unit 20 which controls at least the braking action at the vehicle brakes Bij via the signals Aij as a known anti-blocking control system, drive-slip control system, braking force distribution system and/or driving dynamic control system.

The braking control unit 20 also determines the signal S or Sij and drives the display device 30 therewith.

As mentioned above, the invention is concerned with detecting a wheel having a circumference or diameter which departs from the other wheels. In this embodiment, the detection of an emergency wheel is primarily described. For this purpose, different steps are required.

1. Detection of an Emergency Wheel

Step a):

The wheel speed differences $\Delta h$ and $\Delta v$ at each axle are determined from the detected wheel rpms at the rearward axle and the forward axle:

$$\Delta v = (Nvl - Nvr)$$

and $$\Delta h = (Nhl - Nhr)$$

Then a check is made as to whether the difference $(\Delta v - \Delta h)$ between these wheel speed differences lies within a first band. The band is determined by the threshold values $\Delta vh_{min}$ and $\Delta vh_{max}$:

$$\Delta vh_{max} > ((Nvl - Nvr) - (Nhl - Nhr)) > \Delta vh_{min}$$

or $$\Delta vh_{max} > (\Delta v - \Delta h) > \Delta vh_{min} \quad \text{(Condition 1)}$$

The threshold values $\Delta vh_{min}$ and $\Delta vh_{max}$ are determined in such a manner that they define the smallest and largest deviation of the difference $(\Delta v - \Delta h)$. In the detection of an emergency wheel, the emergency wheel band can be determined by the threshold values $\Delta vh_{min}$ and $\Delta vh_{max}$, for example, as follows:

$\Delta vh_{max}$=15% of the vehicle longitudinal speed plus 2 km/h $\Delta vh_{min}$=12% of the vehicle longitudinal speed minus 2 km/h.

If the difference $(\Delta v - \Delta h)$ lies within the band $(\Delta vh_{min}; \Delta vh_{max})$, that is, the condition 1 is satisfied, this is a first indication as to the presence of a wheel having a deviating diameter which is relevant for display.

Step b):

The amounts of the speed longitudinal differences $\Delta r$ and $\Delta l$ are determined from the detected rpms of the wheels at the right and left vehicle sides:

$$\Delta r = |Nvr - Nhr|$$

and $$\Delta l = |Nvl - Nhl|$$

Then a check is made as to whether one of the speed longitudinal differences on one vehicle side has a sufficiently high value; whereas, the other speed longitudinal difference assumes only a very low value. This means that a check is made as to whether:

$$\Delta r > SW1 \text{ AND } \Delta l < SW2$$

OR $$\Delta l > SW1 \text{ AND } \Delta r < SW2 \quad \text{(Condition 2)}$$

Here, the terms "AND" and "OR" indicate the known logic operations.

The threshold values SW1 and SW2 can, for example, be determined as follows for an emergency wheel detection:

SW1=3% of the vehicle longitudinal speed plus 1.5 km/h

SW2=1.5% of the vehicle longitudinal speed minus 3 km/h.

If condition 2 is satisfied, then this is an indication for the presence of a wheel having a deviating diameter relevant for display.

The condition 2 can be used either in combination with condition 1 to detect a display-relevant deviation; however, it can also be provided that the condition 2 is used by itself for outputting the signal S to the display 30.

In the last case (check of condition 2 by itself), one obtains a very simple and cost-effective system for detecting an emergency wheel which operates especially reliably in travel through a curve.

In the last case as in the first case, one however obtains only the recognition as to whether an emergency wheel is present or not; however, the position of the emergency wheel cannot be determined thereby. For this purpose, the following additional steps are required.

If it has been determined in steps (a) and (b) that the conditions 1 and 2 are satisfied, then the flags are set:

"Flag_NR$_{vl}$", "Flag_NR$_{hl}$", "Flag_NR$^{vr}$", and "Flag_NR$_{hr}$".

2. Recognition of an Emergency Wheel Position

The position of the emergency wheel can be determined from a comparison of the wheel speed differences longitudinally and transversely. This means in detail an inquiry of the following conditions or the change of the flags set in part 1.

Step c):

Evaluation of the longitudinal differences:

$Nvl - Nhl$ is negative → clear Flag_NR$_{vl}$ $Nvl - Nhl$ is positive → clear Flag_NR$_{hl}$ $Nvr - Nhr$ is negative → clear Flag_NR$_{vr}$ $Nvr - Nhr$ is positive → clear Flag_NR$_{hr}$ Here, the inquiry "positive?" or "negative?" can mean the comparison of the particular difference to a small positive or negative threshold value close to zero.

Step d):

Evaluation of cross differences:

$\Delta h > \Delta v$ → clear Flag_NR$_{vl}$ and Flag_N$_{vr}$ $\Delta v > \Delta h$ → clear Flag_NR$_{hl}$ and Flag_NR$_{hr}$ wherein $\Delta v = (Nvl - Nvr)$ and $\Delta h = (Nhl - Nhr)$.

The flag "Flag_NR$_{ij}$", which remains set after the steps (a), (b), and (c), determines the position ij of the emergency wheel whereupon the signal Sij is outputted to the display unit 30 which then displays the position of the emergency wheel in a suitable manner.

As an alternative, or as a supplement to the display, the mode of operation of the braking control system and/or drive control system 20 can be changed by the signal S (an emergency wheel is mounted) or Sij (the mounted emergency wheel has the position ij). This can mean a switchoff of the system especially for simply detecting the existence of the emergency wheel (signal S). If the position of the emergency wheel is known, the closed-loop control algorithm or the open-loop control algorithm in the control apparatus 30 can be changed in correspondence to the different circumference of the emergency wheel.

Furthermore, it can provided that a filtering of the results takes place as required. Thus, a drive-slip control (ASR) detects, for example, an emergency wheel with the presence of the emergency conditions after one second; whereas, an anti-block protective system (ABS) detects an emergency wheel after five seconds. An arrangement which monitors an rpm fault is thereby essentially driven unfiltered.

For systems, which detect the rpms Nhr and Nhl of the rear wheels with a single rpm sensor, the satisfaction of the following additional condition:

$Nhl-Nvl>SW3$ AND $Nhr-Nvr>SW3$ leads to the setting of the two emergency wheel flags "Flag_$NR_{hr}$" and "Flag_$NR_{hl}$".

What is claimed is:

1. A system for outputting a signal representing a condition of the wheels of a motor vehicle, the system comprising:

means for generating rpm signals (Nij) representing the rotational movements of the wheels; and, evaluation means functioning to:

form first difference values ($\Delta r$, $\Delta l$) for the rpm differences of at least two vehicle wheels on the two sides of the vehicle in dependence upon said generated rpm signals (Nij);

compare the first difference value ($\Delta r$) of one side of said vehicle to a first adequately large threshold value (SW1);

compare the first difference value ($\Delta l$) of the other side of said vehicle to a first small threshold value (SW2); and, output a signal (S; Sij) when all of the following conditions are satisfied: (a) the first difference value ($\Delta r$) of said one side of said vehicle exceeds said first adequately large threshold value (SW1); (b) the first difference value ($\Delta l$) of said other side of said vehicle is less than said first small threshold value (SW2); and, (c) said first difference value ($\Delta r$) exceeds said first adequately large threshold value (SWl) simultaneously with said first difference value ($\Delta l$) being less than said first small threshold value (SW2).

2. The system of claim 1, wherein the evaluation means is so configured that, in dependence upon the generated rpm signals (Nij), second difference values ($\Delta h$, $\Delta v$) for the rpm differences of at least two vehicle wheels in the rearward and the forward vehicle region are formed; and, the signal (S; Sij) is only outputted when the difference ($\Delta vh$) of the second difference values is located within a band determined by pregivable second threshold values ($\Delta vh_{min}$, $\Delta vh_{max}$).

3. The system of claim 2, wherein the evaluation means is so configured that, in dependence upon the generated rpm signals (Nij), second difference values ($\Delta h$, $\Delta v$) are formed for the rpm differences of at least two vehicle wheels in the rearward and forward vehicle region; and, the signal (S; Sij) is only outputted when the difference ($\Delta vh$) of the second difference values is located within a band, which is determined by pregivable second threshold values ($\Delta vh_{min}$, $\Delta vh_{max}$) with the signal (Sij) further being dependent upon:

a third comparison of the rpm signals (Nij) of the wheels on the right vehicle side and a third comparison of the rpm signals (Nij) of the wheels on the left vehicle side; and, a fourth comparison of the second difference values ($\Delta h$, $\Delta v$) to each other.

4. The system of claim 2, wherein the signal (S; Sij) is only outputted when the display-relevant condition is detected for the duration of a pregiven time span.

5. The system of claim 2, wherein said evaluation means is so configured that the signal (S; Sij) is outputted when the formed first difference values ($\Delta r$, $\Delta l$) both exceed a pregivable third threshold value (SW3).

6. The system of claim 5, wherein at least one of said first, second and third threshold values are pregiven in dependence upon a value representing the vehicle longitudinal speed.

7. The system of claim 2, further comprising at least one of the following: display means for displaying a display-relevant condition to the driver of said vehicle by driving the display means with said signal (S; Sij); and, a braking system and/or a drive control system having an operating state changed in dependence upon said outputted signal (S; Sij).

8. The system of claim 1, wherein said condition includes at least one of the following: a first condition wherein a wheel has a lesser diameter than the remaining wheels and a second condition wherein a loss of air has occurred in a tire of a wheel.

* * * * *

UNITED STATES PATENT AND TRADEMARK OFFICE
CERTIFICATE OF CORRECTION

PATENT NO.      : 6,304,802 B1
DATED           : October 16, 2001
INVENTOR(S)     : Ewald Suible, Walter Berger and Martin Pfau It is certified that error appears in the above-identified patent and that said Letters Patent is hereby corrected as shown below:

Column 5,
Line 39, between "(Nij)" and ";" insert the following:
-- with said first difference values ($\Delta r$, $\Delta l$) being given by
$$\Delta r = |Nvr - Nhr|$$
$$\Delta l = |Nvl - Nhl|;$$
wherein:    Nvr is the wheel rpm of the right forward wheel
            Nhr is the wheel rpm of the right rearward wheel
            Nvl is the wheel rpm of the left forward wheel
            Nhl is the wheel rpm of the left rearward
            wheel. --

Column 6,
Line 1, delete "(SWl)" and substitute -- (SW1) -- therefor.

Signed and Sealed this

Eighteenth Day of February, 2003

JAMES E. ROGAN
*Director of the United States Patent and Trademark Office*